Oct. 6, 1959    E. H. HAHN, JR    2,907,214

FLEXIBLE DRIVE

Filed Nov. 5, 1956

INVENTOR.
ELMER H. HAHN, JR.
BY Hudson, Boughton,
Williams, David & Hoffmann
ATTORNEYS

2,907,214
FLEXIBLE DRIVE

Elmer H. Hahn, Jr., Cleveland, Ohio, assignor to The Leece-Neville Company, Cleveland, Ohio, a corporation of Ohio Application November 5, 1956, Serial No. 620,253

1 Claim. (Cl. 74—6)

This invention relates to flexible drive devices of the kind having a rotatable and axially shiftable pinion for releasable driving engagement with a ring gear or the like. Flexible drives of this kind are frequently used for cranking internal combustion engines, and by way of example, the flexible drive of the present invention is hereinafter described as applied to that use, but without any intention of limiting the invention solely to engine cranking.

An object of this invention is to provide such a flexible drive having a rotatable and axially shiftable pinion and embodying novel clutch means for transmitting driving torque to the pinion.

Another object is to provide a flexible drive of the type mentioned which is practical and efficient in character and which is of a relatively simplified construction by reason of the use therein of a novel clutch means of the spring type which is automatically releasable upon overrunning of the pinion.

A further object is to provide a novel flexible drive of the type above indicated in which the clutch means for the pinion comprises a pair of clutch hubs and a cooperating spring adapted for self-tightening engagement with the hubs for establishing a releasable torque connection between the driving means and pinion.

Still another object is to provide such a novel flexible drive employing a clutch of the self-tightening spring type and in which the driving means for the pinion comprises an axial spline connection and a helical spline connection, the axial spline connection being formed by cooperating elements of two adjacent members of a group of three coaxial members and the helical spline connection also being formed by cooperating elements of two adjacent members of such group.

Yet another object is to provide a novel flexible drive of the kind above referred to, in which the three coaxial members of the driving means comprise a rotatable shaft, a drive sleeve surrounding the shaft, and a shift sleeve between the shaft and the drive sleeve, and wherein the clutch hubs are in a substantially axially aligned relation with the self-tightening clutch spring spanning the adjacent ends of the hubs.

Additionally, this invention provides a novel flexible drive of the character mentioned above, in which the clutch spring has a frictional connection only with the clutch hubs and is located in a spring chamber defined between the hubs and a surrounding housing member connected for rotation with one of the hubs.

The invention can be further briefly summarized as consisting in certain novel combinations and arrangements of parts hereinafter described in detail and particularly set out in the claims hereof.

In the accompanying drawing forming a part of this specification—

Figure 1:
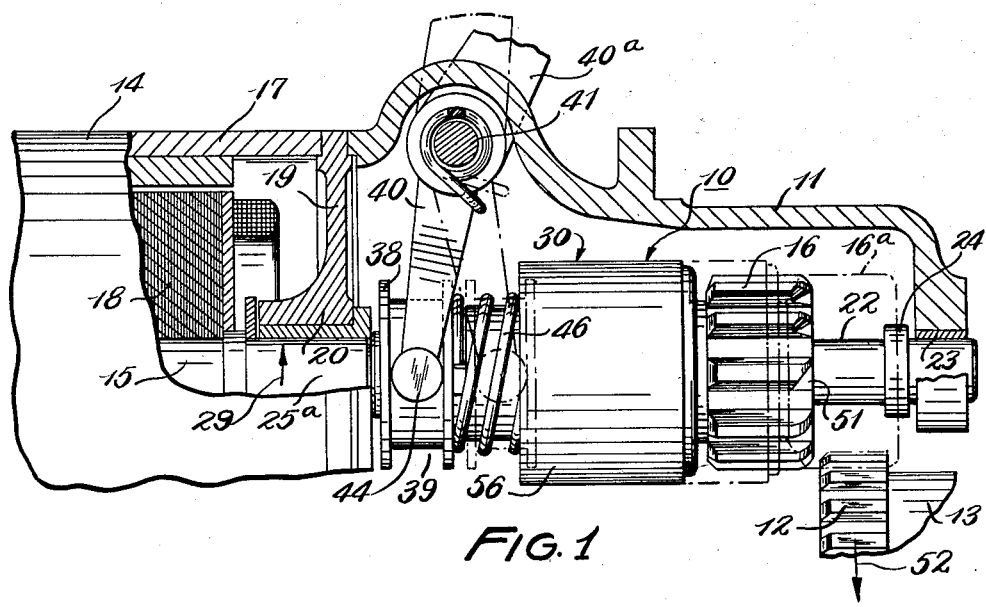
Fig. 1 is a partial plan view with portions broken away, showing a flexible drive embodying the present invention.
Figure 2:
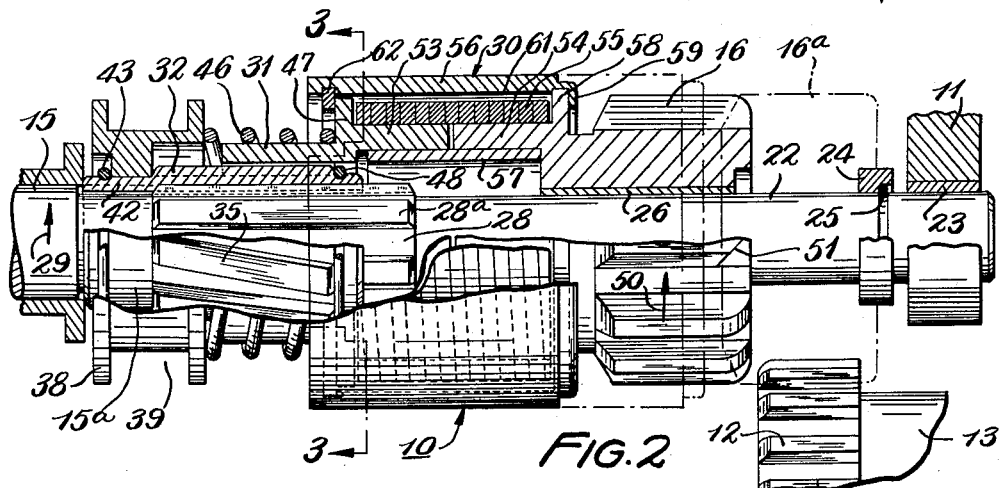
Fig. 2 is a partial axial sectional view of the flexible drive, further illustrating the construction thereof.
Figure 3:
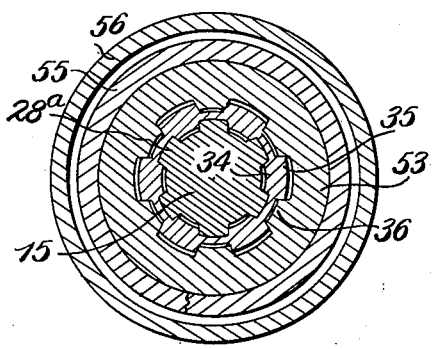
Fig. 3 is a transverse section taken through the flexible drive on section line 3—3 of Fig. 2.
Figure 4:
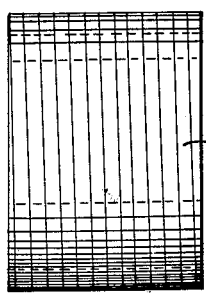
Fig. 4 is a side elevation of the clutch spring showing the same in detached relation.

As one practical embodiment of this invention, the accompanying drawing shows the novel flexible drive 10 as being carried by a mounting bracket 11, by which the device can be mounted on an internal combustion engine or other apparatus, in adjacent relation to a ring gear 12 or the like to be driven, such as a ring gear carried by a flywheel 13 of the engine. The flexible drive 10 comprises, in general, an electric driving motor 14 having an armature shaft 15, a rotatable and axially shiftable drive pinion 16 releasably engageable with the ring gear 12, and means flexibly connecting the pinion with the armature shaft for actuation by the latter.

The driving motor 14 may be a conventional form of electric starting motor or the like having a frame 17 which is suitably connected with the bracket 11 for mounting the motor thereon. The motor 14 is here shown as having an armature 18 rotatable in the frame 17 and carried by the armature shaft 15. The frame of the motor 14 includes an end plate 19 having a central bearing portion 20 through which the armature shaft 15 extends.

The shaft 15 includes a relatively reduced shaft portion 22 at the end thereof which is rotatably supported in an outboard bearing 23 of the mounting bracket 11. The pinion 16 is mounted on the shaft portion 22 so as to be rotatable and axially shiftable thereon. A collar 24 is mounted on the shaft portion 22 as a stop for the axial movement of the pinion in the engaging direction and is positioned adjacent the outboard bearing 23 by a snap ring 25. The pinion is preferably mounted on the shaft portion 22 by being provided with a bushing 26.

Adjacent the junction of the reduced shaft portion 22 with the full size portion 15a, the shaft 15 is provided with a splined portion 28 comprising an annular group of straight or axial spline elements or teeth 28a. The normal direction of rotation of the shaft 15 as produced by energization of the motor 14 is indicated by the arrow 29, and when the armature shaft is viewed from the inner or bracket end thereof, this direction of rotation is a clockwise rotation.

The pinion 16 is flexibly connected with the shaft 15 through a clutch device 30 and through a coupling means comprising sleeve members 31 and 32 disposed around the shaft. The sleeve 31 is referred to herein as the drive sleeve and is connected with the pinion 16 through the clutch device 30. The sleeve 32 is referred to herein as the shift sleeve and is disposed between the drive sleeve 31 and the splined portion 28 of the shaft 15.

The shift sleeve 32 is provided internally thereof with an annular group of straight or axial spline elements or teeth 34 which have a meshed engagement with the spline elements 28a of the spline shaft portion 28. Externally thereof the shift sleeve 32 is provided with an annular group of helical spline elements or teeth 35, which are here shown as having a right hand helical inclination or pitch. The drive sleeve 31 is provided internally thereof with an annular group of spline elements or teeth 36 which are in meshed engagement with the spline elements 35 and also have a right hand helical inclination or pitch.

Suitable shifting mechanism is provided for the flexible drive 10 and is here represented by a shift collar 38 having an external annular groove 39 and a shift lever 40 swingably supported by a pivot shaft 41. The shift collar 38 is mounted on a reduced end portion 42 of the shift sleeve 32 and is retained thereon by a snap ring 43.

The shift lever 40 is provided with a forked end 44 which engages in the groove 39 of the shift collar.

A suitable energizing circuit is provided for the electric motor 14 and includes a starting switch (not shown) which is preferably located adjacent the outwardly projecting arm 40a of the shift lever 40.

Axial movement imparted to the shift sleeve 32 by the lever 40 is transmitted to the drive sleeve 31 through a compression spring 46 located in surrounding relation to the drive sleeve and disposed between the shift collar 38 and a radial annular flange 47 of the drive sleeve. Complete separation of the drive sleeve 31 from the shift sleeve 32 under the expansive action of the spring 46 is prevented by a snap ring 48 forming a stop which is engageable by the ends of the spline elements 36 of the drive sleeve.

From the construction of the flexible drive 10 as thus far described, it will be seen that when axial movement toward the right is imparted to the shift sleeve 32 by the lever 40, axial movement in the same direction will be transmitted to the drive sleeve 31 through the spring 46, and thence, to the pinion 16 through the clutch device 30. The pinion 16 is thereby moved into engagement with the ring gear 12. If the teeth of the pinion 16 move immediately into mesh with the teeth of the ring gear 12, the pinion will thereupon assume a fully engaged position abutting the stop collar 21 corresponding with the broken line position 16a of the drawing.

If the teeth of the pinion 16 abut against the teeth of the ring gear 12, the helical spline connection formed by the cooperating spline elements 35 and 36 will cause rotation of the pinion 16 during the continued movement of the shift sleeve 32 toward the right. This rotation of the pinion 16 will be in a clockwise direction, as indicated by the arrow 50 and will cause a clearing of the abutting tooth engagement, with the result that the pinion teeth will then become aligned with tooth spaces of the ring gear and will readily move into a fully meshed engagement with the latter. If desired, the ends of the pinion teeth can be provided with a suitable chamfer 51 to facilitate the clearing of the abutting engagement.

The motor 14 is energized substantially upon the occurrence of the full engagement of the pinion 16 with the ring gear 12, whereupon the pinion will rotate the ring gear in the direction of the arrow 52 to cause starting of the engine. The rotation of the shaft 15 by the energization of the motor 14 is also effective through the cooperating spline elements to cause relative axial separation between the sleeve members 31 and 32 for returning, or assisting in the return of, these sleeve members to their initial position. The shifter lever 40 has sufficient free movement to permit such return actuation of the sleeve members by the rotation of the shaft 15.

Within the contemplation of the present invention, the clutch device 30 constitutes an important novel feature of the flexible drive 10. This clutch comprises a pair of clutch hubs 53 and 54, a helical clutch spring 55 and a housing 56. The clutch hubs 53 and 54 are in surrounding relation to the shaft 15 and are here shown as being substantially in an axial alignment. The hub 53 is carried by the drive sleeve 31 and the hub 54 is carried by the pinion 16. This axial alignment of the hubs 53 and 54 is preferably maintained by a bushing 57 located in the hubs in spanning relation thereto. The hub 54 includes a radial annular flange 58 corresponding with the annular flange 47 of the drive sleeve 31.

The housing 56 is carried by one of the clutch hubs, in this instance clutch hub 54, and is connected therewith by a crimped or deflected portion 59 engaging the flange 58. The housing 56 is preferably in the form of an annular sleeve disposed in surrounding relation to the hubs and defines therewith an annular spring chamber 61 in which the clutch spring 55 is disposed. The housing 56 is preferably provided internally thereof with a snap ring 62 in adjacent relation to the flange 47.

The clutch spring 55 is fitted to the hubs 53 and 54 and has a frictional engagement therewith such that the spring will be self-tightening against the hubs and will grip the same in response to a limited relative rotation between the hubs in a spring tightening direction and will release the hubs in response to a relative rotation therebetween in a spring loosening direction. The direction of the wind or pitch of the clutch spring 55 bears an important relation to the direction of inclination or pitch of the helical spline connection formed by the spline elements 35 and 36.

As shown in the drawing, the clutch spring 55 has a right-hand wind or pitch corresponding with the right-hand pitch of the helical spline connection and when the drive sleeve 31 and the clutch hub 53 are rotated in the direction of the arrow 50, either as the result of a relative axial movement between the shift sleeve and the drive sleeve or by the driving action of the electric motor 14, the frictional drag of the clutch spring will cause the latter to be automatically contracted and thereby tightened against the clutch hubs. This contraction of the clutch spring causes the same to grip the clutch hubs 53 and 54 to establish a torque connection therebetween for transmitting torque from the motor 14 to the pinion 16 for driving the latter in the cranking direction indicated by the arrow 50. This torque transmitting connection will be established between the clutch hubs 53 and 54 by the spring 55 whenever the clutch hub 53 is rotated in the direction of the arrow 29 at a speed relatively faster than that of the clutch hub 54.

Whenever the pinion 16 is driven by the ring gear 12, such as may occur upon the starting of the engine, and the pinion is rotated in the direction of the arrow 50 at a faster rate of speed than the clutch hub 53, the clutch hub 54 tends to overrun the clutch hub 53 and the frictional drag of the clutch spring on the hub 54 will tend to produce an unwinding effect on this spring and a consequent loosening of the spring on the clutch hubs. Thus, whenever the pinion 16 overruns the drive sleeve 31, the clutch 30 will be automatically released so that no damage will occur to the flexible drive.

As mentioned above, the clutch spring 55 is a helical spring and, in this instance, is formed of wire of a quadrangular cross-section and the adjacent convolutions of the wire have their axial side faces in a substantially abutting relation. The spring 55 is here shown as being disposed in surrounding relation to the hubs 53 and 54 and spans the adjacent ends thereof. The ends of the spring 55 have no permanent connection or anchorage on the hubs 53 and 54, inasmuch as the spring has a frictional engagement or interference fit only with the hubs.

From the accompanying drawing and the foregoing detailed description it will now be readily understood that this invention provides a novel flexible drive for a ring gear or the like which is of a practical and simplified construction. It will now be understood further that the simplified form of this flexible drive is largely due to the automatically acting spring type clutch employed between the driving means and the axially shiftable pinion.

Although the novel drive device of this invention has been illustrated and described herein to a somewhat detailed extent, it will be understood, of course, that the invention is not to be regarded as being limited correspondingly in scope, but includes all changes and modifications coming within the terms of the claim hereof.

Having thus described my invention, I claim:

In a flexible drive for a ring gear or the like; a rotatable drive shaft; a pinion rotatable on and shiftable axially along said shaft; means for flexibly connecting said pinion with said shaft comprising a drive sleeve surrounding said shaft and a shift sleeve disposed between said shaft and said drive sleeve; said shaft, said drive sleeve and said shift sleeve comprising a group of three coaxial members; coacting elements defining a straight spline connection between said shaft and said shift sleeve; coacting elements defining a helical spline connection between said drive sleeve and said shift sleeve; means for moving said shift sleeve axially along said shaft; spring means adapted to be loaded by the axial movement of said shift sleeve for imparting axial movement to said drive sleeve in a direction to engage said pinion with said gear; a pair of substantially axially aligned clutch hubs one connected with said drive sleeve and both supported from said pinion; a bushing spanning said hubs at the adjacent ends thereof and maintaining alignment therebetween; said hubs and bushing surrounding said shaft in spaced relation thereto whereby said shift sleeve is received between said hubs and bushing and said shaft when said shift sleeve is moved axially with respect to said drive sleeve; and a helical clutch spring disposed substantially coaxially of said shaft and in spanning relation to the adjacent ends of said hubs; said clutch spring being automatically movable to a clutch-releasing normal condition and being self-tightening against said hubs for establishing a torque connection between said pinion and the cooperating sleeves of said group; said helical spline connection being effective upon axial movement of said shift sleeve with respect to said drive sleeve to cause said clutch spring to tighten and establish said torque connection and to rotate said pinion to facilitate meshing of said pinion with said gear teeth.

References Cited in the file of this patent

UNITED STATES PATENTS

| | | |
|---|---|---|
| 1,661,372 | Kroeger | Mar. 6, 1928 |
| 1,892,056 | Jackson et al. | Dec. 27, 1932 |
| 2,004,650 | Collyear et al. | June 11, 1935 |
| 2,609,694 | Buxton | Sept. 9, 1952 |
| 2,612,783 | Brook et al. | Oct. 7, 1952 |
| 2,745,289 | Miller | May 15, 1956 |
| 2,841,988 | Sabatini | July 8, 1958 |